(12) United States Patent
Oosaki (10) Patent No.: US 8,599,454 B2
(45) Date of Patent: Dec. 3, 2013

(54) IMAGE READING APPARATUS AND GROUND COLOR CORRECTION METHOD

(75) Inventor: Masayoshi Oosaki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 70 days.

(21) Appl. No.: 13/431,307

(22) Filed: Mar. 27, 2012

(65) Prior Publication Data

US 2013/0077139 A1    Mar. 28, 2013

(30) Foreign Application Priority Data

Sep. 28, 2011 (JP) ................................. 2011-212110

(51) Int. Cl.
*H04N 1/04* (2006.01)

(52) U.S. Cl.
USPC ............ 358/505; 358/488; 358/471; 358/474

(58) Field of Classification Search
USPC ........................... 358/505, 488, 471, 474, 444
See application file for complete search history.

(56) References Cited

U.S. PATENT DOCUMENTS

| 5,373,371 | A | * | 12/1994 | Masui | ........................... | 358/444 |
| 5,471,319 | A | * | 11/1995 | Ogawa | ........................... | 358/445 |
| 2011/0075233 | A1 | | 3/2011 | Oosaki | | |

FOREIGN PATENT DOCUMENTS

| JP | 61-256866 A | 11/1986 |
| JP | 4-265070 A | 9/1992 |
| JP | 2005-064869 A | 3/2005 |
| JP | 2011-077880 A | 4/2011 |

* cited by examiner

*Primary Examiner* — Houshang Safaipour
(74) *Attorney, Agent, or Firm* — Scully, Scott, Murphy & Presser, PC (57) ABSTRACT

An image reading apparatus includes: a reading device; and a control unit, wherein the control unit configured to perform: an image reading process of controlling the reading device; a line ground-color-density detection process of detecting a ground-color-density of respective lines; a line count process of counting the number of adjacent lines, which is the number of lines that are adjacent to each other and a difference of the ground-color-densities of the lines falls within a reference range; a document ground-color-density extraction process of extracting a ground-color-density of a line in an area having the largest number of adjacent lines from a read image of the document image; and a density determination process of determining whether the ground-color-density of the document image is a reference density or lower, and a ground color correction process of performing.

6 Claims, 7 Drawing Sheets

IMAGE READING APPARATUS AND GROUND COLOR CORRECTION METHOD

CROSS-REFERENCE TO RELATED APPLICATION

This application claims priority from Japanese Patent Application No. 2011-212110 filed on Sep. 28, 2011, the entire subject matter of which is incorporated herein by reference.

BACKGROUND

Technical Field

This disclosure relates to an image reading apparatus and a method of correcting a ground color of a read image that is obtained by reading a document image.

SUMMARY

A ground color of the document image does not consistently exist in a leading end area of the read image. For example, there is a document in which a solid image of a color having an image density higher than a predetermined threshold is printed in a whole leading end area, and a wide range area wider than the leading end area and having an average value of image densities equal to or smaller than the threshold exists in the rear of the leading end area, and then characters and the like are printed in the wide range area. In a read image of such document, a ground color of the document image exists in the wide range area, not in the leading end area.

In the related image reading apparatus, the ground-color-density of the document image is consistently limited to the ground-color-density of the leading end area of the read image. Therefore, the ground color of the document image is not corrected in the wide range area of the read image, so that the characters and the like are not to be visible.

This disclosure discloses at least a technology of suppressing a ground-color-density of a document image from being consistently limited to a ground-color-density of a leading end area of a read image.

In view of the above, an image reading apparatus of this disclosure comprise: a reading device configured to read a document image; and a control unit. The control unit is configured to perform an image reading process; a line ground-color-density detection process; a line count process; a document ground-color-density extraction process; a density determination process; and a ground color correction process. The image reading process controls the reading device to read the document image every line and acquire read data of respective lines. The line ground-color-density detection process detects a ground-color-density of respective lines from the read data acquired by the image reading process. The line count process counts the number of adjacent lines, which is the number of lines that are adjacent to each other and a difference of the ground-color-densities of the lines falls within a reference range, based on a detection result of the line ground-color-density detection process. The document ground-color-density extraction process extracts a ground-color-density of a line in an area having the largest number of adjacent lines from a read image of the document image, as a ground-color-density of the document image, based on a count result of the line count process. The density determination process determines whether the ground-color-density of the document image extracted in the document ground-color-density extraction process is a reference density or lower. The ground color correction process performs, when it is determined in the density determination process that the ground-color-density of the document image is the reference density or low, a ground color correction for the read data, in response to the ground-color-density of the document image.

According to this disclosure, the number of lines, which are adjacent to each other and the difference between the ground-color-densities of the lines falls within the reference range, is set as the number of adjacent lines, the ground-color-density of the line in the area having the largest number of adjacent lines becomes the ground-color-density of the document image, and it is determined whether it is necessary to perform the ground color correction process, based on the ground-color-density of the document image. Accordingly, for example, when the document has the area, in which the number of adjacent lines is larger than that in the leading end area in which the line reading is performed fastest, it is possible to suppress the ground-color-density of the document image from being consistently limited to the ground-color-density of the leading end area of the read image.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

Figure 1:
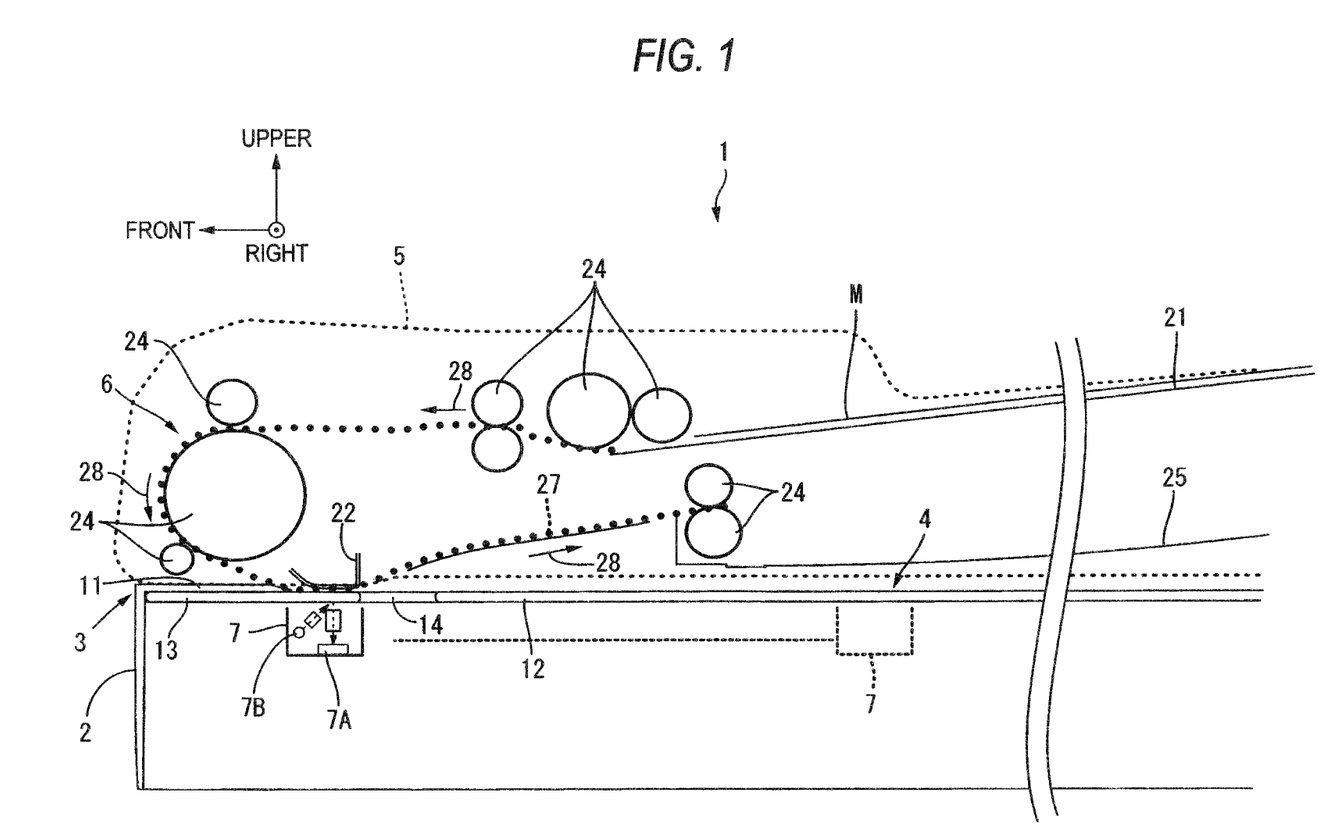
FIG. 1 is a partial sectional view schematically illustrating a configuration of a multi-function apparatus according to an illustrative embodiment of this disclosure.

A multi-function apparatus 1 according to an illustrative embodiment will be described with reference to FIGS. 1 to 7. In the below descriptions, the left side of FIG. 1 is referred to as a front side of the multi-function apparatus 1, the front side is referred to as a right side of the multi-function apparatus 1 and the upper side is referred to as an upper side of the multi-function apparatus 1. The multi-function apparatus 1 is a multifunctional peripheral apparatus having scanner, printer, copying, facsimile functions and the like and is an example of the image reading apparatus.

(Configuration of Multi-Function Apparatus)

As shown in FIG. 1, the multi-function apparatus 1 includes a main body 2 having a printing mechanism (not shown), and the like, and a scanner unit 3 that is provided above the main body 2. The scanner unit 3 has a document placement part 4 (hereinafter, referred to as FB 4), a document cover 5 and a reading device 7.

The FB 4 includes a frame 11, a first platen grass 12 and a second platen grass 13 made of transparent glass plates, and an intermediate frame 14 that is arranged between the glasses 12 and 13. The FB 4 is openably/closably covered by the document cover 5.

The document cover 5 is rotatably supported to the main body 2 between a closing posture of covering the FB 4 (refer to FIG. 1) and an opening posture of opening the FB 4, and the document cover 5 has an automatic document feeder 6 (hereinafter, referred to as ADF 6), a document tray 21 and a discharge tray 25. The ADF 6 has a pressing member 22, a variety of rollers 24 and the like. The document tray 21 is a tray, on which a document M to be conveyed by the ADF 6 is placed. The ADF 6 is formed with a conveyance path 27 that is a path, along which the document M is conveyed from the document tray 21 toward the discharge tray 25 by the rollers 24 and the like. In the below, a direction following the conveyance path 27 is referred to as a conveyance direction. In FIG. 1, the conveyance direction is shown with an arrow 28.

The reading device 7 is provided to be moveable in the front-rear direction by a moving mechanism (not shown) below the frame 11 and the like. In FIG. 1, the reading device 7 faces to the pressing member 22 with interposing the second platen grass 13. The reading device 7 has a configuration having a CIS (Contact Image Sensor) in which a plurality of reading elements 7A is arranged side by side in the left-right direction, and a plurality of light sources 7B of RGB is arranged in the vicinity of the reading device 7. In the meantime, the reading device 7 is not limited to the CIS and may be a configuration having a CCD (Charge Coupled Drive) image sensor.

According to the above configuration, the scanner unit 3 can perform FB reading and ADF reading. The FB reading is a method of reading one surface of the document M, which is placed on the FB 4 with being stationary, i.e., a lower surface in FIG. 1. In the FB reading, the reading device 7 reads the lower surface of the document M while moving from the position shown in FIG. 1 to a position shown with the dotted line in FIG. 1. The ADF reading is a method of reading one surface of the document M placed on the document tray 21, i.e., an upper surface in FIG. 1. In the ADF reading, the reading device 7 is positioned below the second platen grass 13 (refer to FIG. 1), and the reading device 7 reads one surface of the document M while conveying the document M by ADF 6 from the document try 21 toward the discharge tray 25.

(Electrical Configuration of Multi-Function Apparatus)

Figure 2:
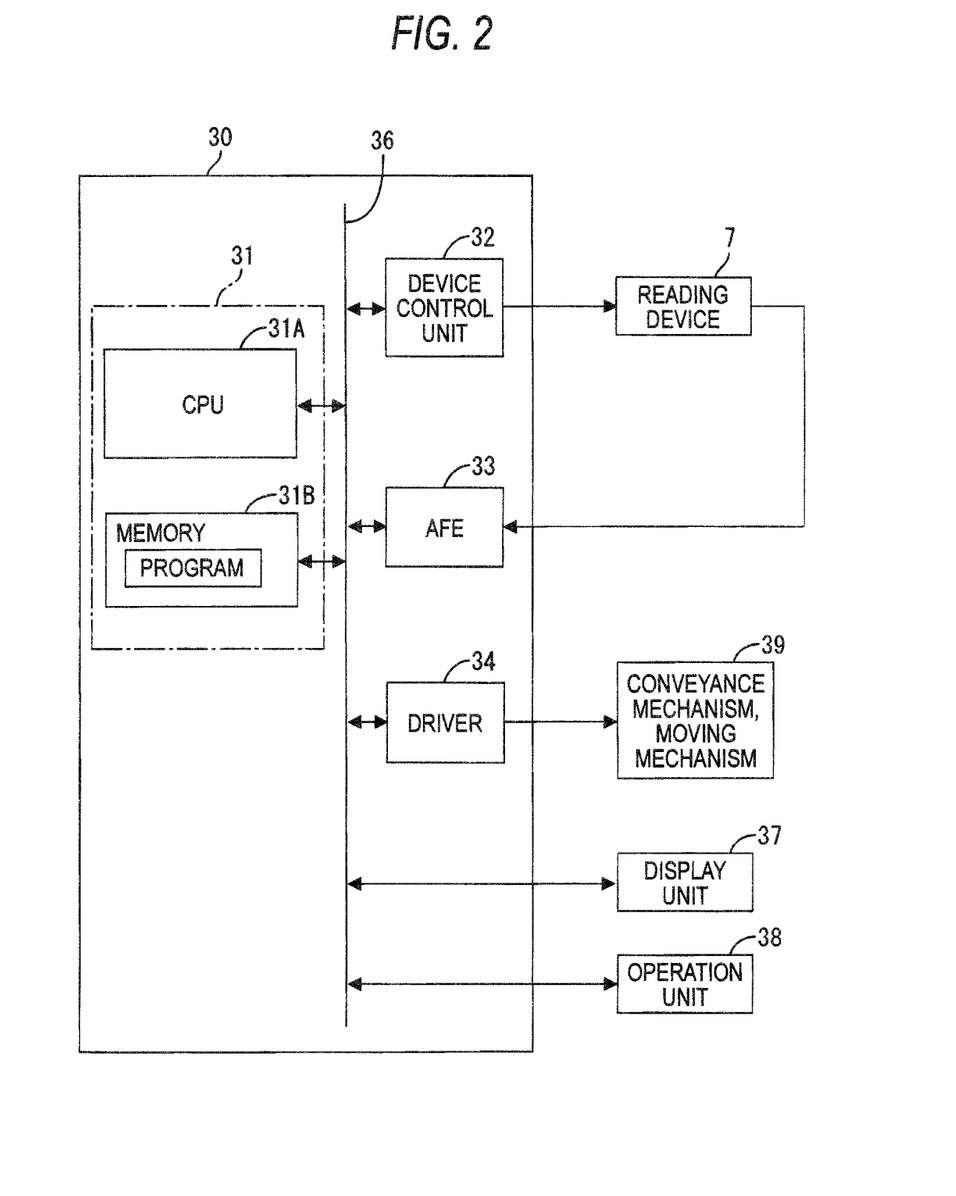
FIG. 2 is a block diagram schematically illustrating an electrical configuration of the multi-function apparatus.

As shown in FIG. 2, the multi-function apparatus 1 has a control substrate 30. The control substrate 30 is mounted with a control unit 31, a device control unit 32, an analog front end (AFE) 33 and a driver 34, to which an operation unit 37, a display unit 38 and the like are connected via a bus 36. The operation unit 37 has a plurality of buttons, and a user can input a variety of instructions and settings with the operation unit. The display unit 38 has a display, a lamp and the like to display a variety of setting screens, an operating state of the apparatus and the like.

The control unit 31 has a central processing unit (CPU) 31A and a memory 31B. The memory 31B stores therein a variety of programs for controlling operations of the multi-function apparatus 1, and the CPU 31A controls the respective units in response to the programs read out from the memory 31B. The memory 31B has a RAM and a ROM. The control unit 31 is an example of the control unit.

The device control unit 32 is connected to the reading device 7 and transmits signals for controlling on/off operations of the light sources 7B and the reading operation of the reading elements 7A to the reading device 7, based on commands from the CPU 31A. When the signals are received from the device control unit 32, the reading device 7 turns on the light sources 7B and receives light reflected from the document M by the reading elements 7A. Also, the reading device 7 outputs first analog read data, which corresponds to an amount of light received by the reading elements 7A, to the AFE 33.

The each AFE 33 is connected to the reading device 7. The AF33 converts the first read data, which is the analog signal output from the reading device 7, into a tone of a RGB (red/green/blue) color system, i.e., second read data, which is a digital value corresponding to an image density. The CPU 31A stores the second read data in the memory 31B via the bus 36. In the below, the digital value is referred to as tone data. In the below descriptions, the second read data is 8-bit (0 to 255) data. In this example, the smaller the tone data, the higher the image density, and the larger the tone data, the lower the image density. The driver 34 is connected to a conveyance mechanism 39 that conveys the document M in the conveyance direction by using the various rollers 24, a moving mechanism of moving the reading device 7 and the like, and the driver 34 controls operations of the conveyance mechanism 39 and the like, based on commands from the CPU 31A.

(Reading Process)

Figure 3:
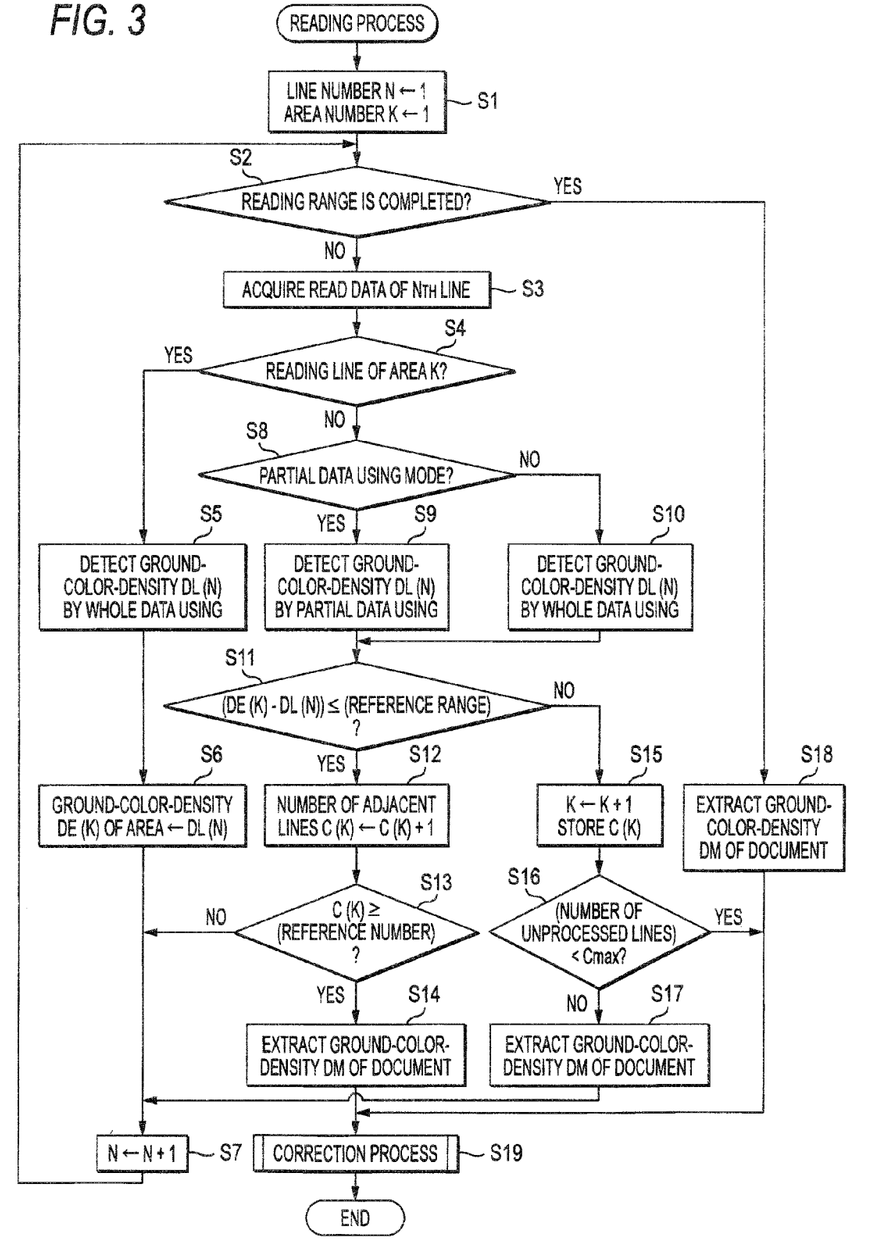
FIG. 3 is a flowchart illustrating reading process.

When a user places the document M on the document tray 21 or FB 4 and inputs a reading instruction of black and white type by using the operation unit 38, the control unit 31 performs a reading process shown in FIG. 3. Specifically, the CPU 31A reads out the program and performs the reading process. The program for executing the reading process is an example of the ground color correction program. According to the reading process, when an image of the document M is read by the reading device 7, the ground correction is performed for the read image, i.e., the read data, depending on a ground-color-density of the image of the document M.

Figure 4:
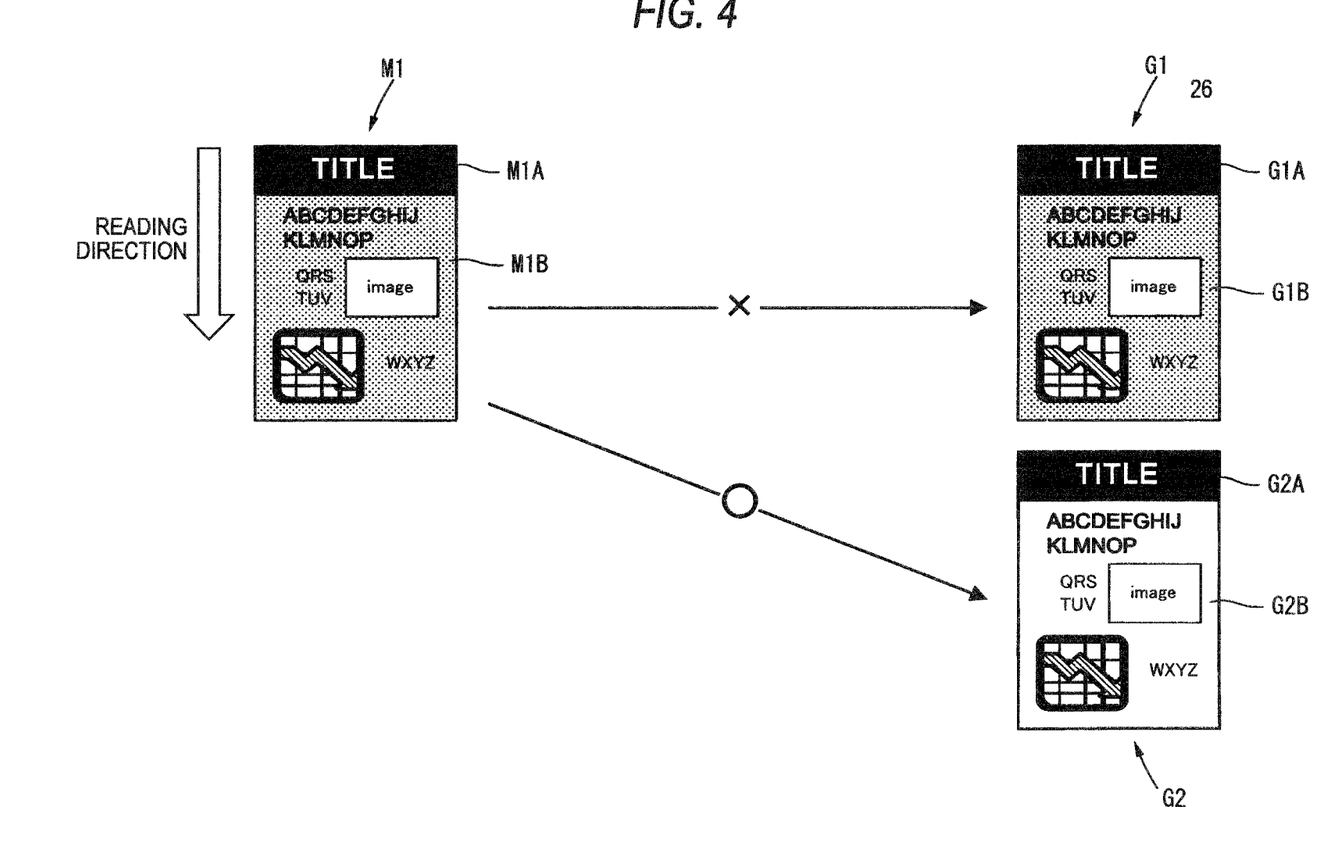
FIG. 4 is a schematic view illustrating a document, a read image in which ground color correction has not been performed, and a read image in which ground color correction has been performed.

The document M1 has an area M1A that is located at a leading end side with respect to the reading direction and an area M1B that is located in the rear of the area M1A. In the area M1A, an image is printed so that a background part of white characters is solid-colored by black. In the area M1B, an image is printed so that a background part of characters, an image and a graph is solid-colored by gray. Additionally, for the FB reading, the reading direction is a direction from a front end of the document M placed on the FB 4 in FIG. 1 toward a rear end thereof. For the ADF reading, the reading direction is a direction from a front end of the document M, which is conveyed by the ADF 6, toward a rear end thereof in the conveyance direction.

(1) Process For Leading Line of Each Area

First, the CPU 31A initializes a line number N and an area number K to 1 (step S1) and determines whether a reading range is completed (step S2). Specifically, when the line number N exceeds the total number of lines Nmax corresponding to a preset reading range, the CPU 31A determines that the reading range is completed. Incidentally, the reading range may be a fixed range irrespective of sizes of the document M, or may be changed depending on sizes of the document M.

When it is determined that the reading range is not completed (step S2: NO), the CPU 31A performs a image reading process controlling the reading device 7 to read an $N_{th}$ line of an image of the document M and thus acquiring the second read data of the $N_{th}$ line (step S3). In the meantime, the line means an image of a linear part of the image of the document M in an arrangement direction of the reading elements 7A, i.e., in a main scanning direction. Also, in the image reading of a black and white type, the CPU 31A acquires only the second data of green indicating the tone data of black and white.

When the CPU 31A acquires the second read data of the $N_{th}$ line, the CPU determines whether the $N_{th}$ line is a first line in an area K, i.e., a leading line (step S4). For example, in the example of FIG. 4, when the CPU 31A acquires the second read data of a first line in the area MLA of the document M or a first line in the area M1B, the CPU determines that the corresponding line is a leading line of the area 1 or area 2.

When it is determined that the second read data of the leading line in the area K is acquired (step S4: YES), the CPU 31A performs a line ground-color-density detection process of detecting tone data of a ground-color-density of a line, for the leading line (step S5). The ground-color-density of a line means a color of an area occupying a wide range in the line image, i.e., an image density of the background part. In the below, the tone data of a ground-color-density of a line may be simply referred to as a ground-color-density DL(N) of a line. Specifically, the CPU 31A performs the line ground-color-density detection process for the leading line by whole data using process of determining the ground-color-density of a line on the basis of read data of the whole line, i.e., all pixels of the line. In the whole data using process, the CPU 31A extracts a predetermined number of pixels from all pixels of a line, in increasing order of the tone data (brightness), and sets an average value of the tone data of the predetermined number of pixels as the ground-color-density DL(N) of the line. In the meantime, in case that the total number of pixels is 1024, the predetermined number is preferably 10, for example.

Figure 5:
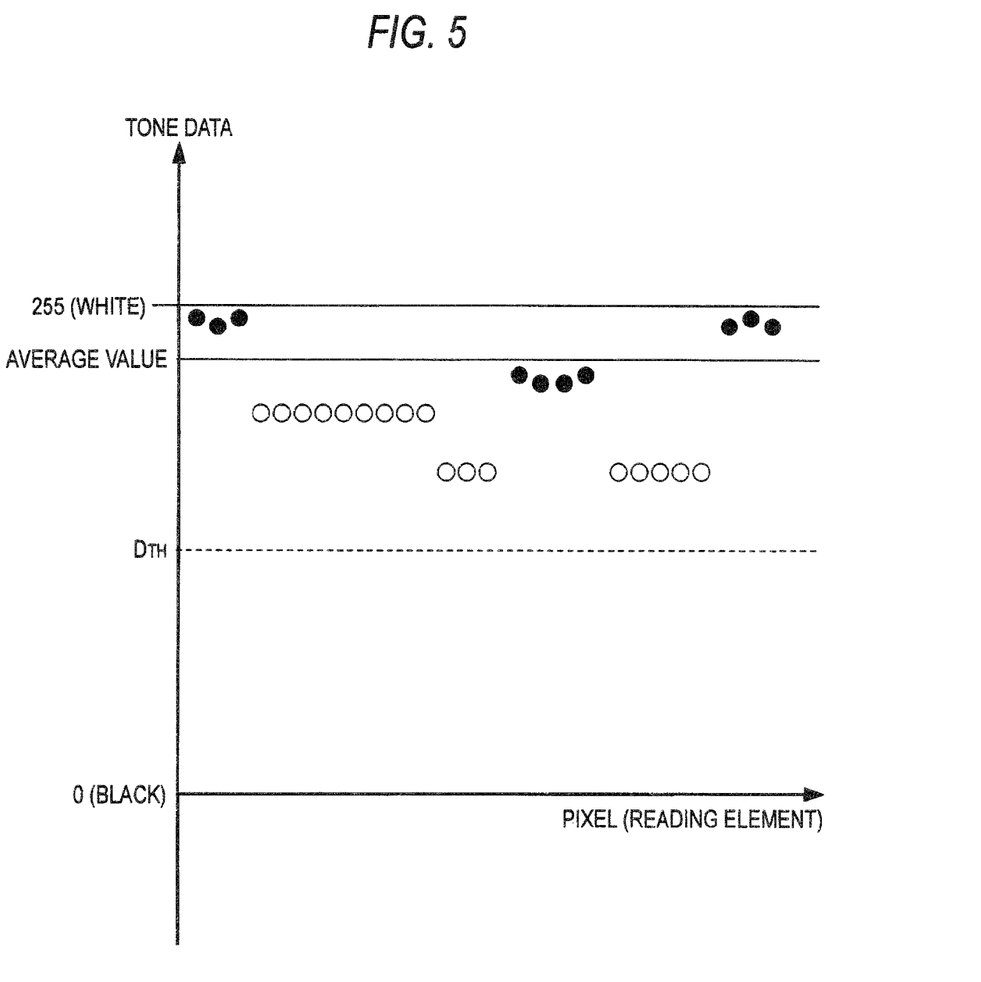
FIG. 5 is a schematic view illustrating a relation between all pixels of a reading device and tone data of each pixel in a case of a whole data using process.

FIG. 5 shows a relation between all pixels (reading elements) of the reading device 7 and the tone data of each pixel. As shown in FIG. 5, an average value of the tone data (black points in FIG. 5) is calculated for ten pixels of increasing order of the tone data, and the average value is set as the ground-color-density DL(N) of the line. When the CPU 31A detects the ground-color-density DL(N) of the leading line, the CPU stores the ground-color-density DL(N) in the memory 31B, as a ground-color-density DE (K) of the area K (step S6), adds 1 to the line number N (step S7) and returns to step S2.

(2) Process for Second Line or Line thereafter of Each Area

When it is determined that the reading range is not completed (step S2: NO), the CPU 31A acquires the second read data of the $N_{th}$ line (step S3). When it is determined that the $N_{th}$ line is a second line or line thereafter of the area K, rather than the leading line (step S4: NO), the CPU determines whether a partial data using mode or a whole data using mode is selected (step S8). The mode selection is set at the time when the user inputs the reading instruction by the operation unit 38, for example. The operation unit 38 is an example of the selection receiving unit.

Figure 6:
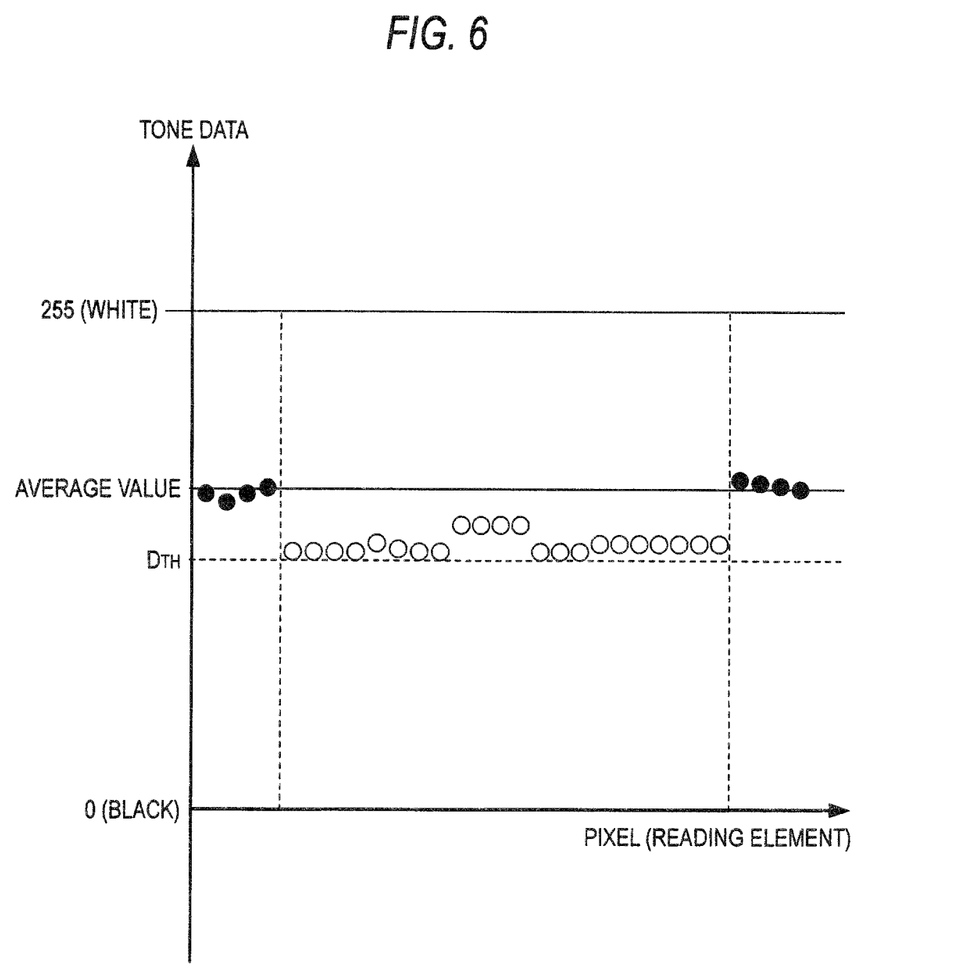
FIG. 6 is a schematic view illustrating a relation between all pixels of a reading device and tone data of each pixel in a case of a partial data using process.

When it is determined that the partial data using mode is selected (step S8: YES), the CPU 31A performs the line ground-color-density detection process for the $N_{th}$ line by a partial data using process (step S9). In the partial data using process, the CPU 31A determines the ground-color-density DL(N) of a line, based on only the second read data of at least one side of right and left end sides of the line. More specifically, the CPU 31A sets an average value of the tone data of the left and right end sides of a line, as the ground-color-density DL(N) of the line. FIG. 6 shows a relation between all pixels (reading elements) of the reading device 7 and the tone data of each pixel. As shown in FIG. 6, an average value of the tone data (black points in FIG. 6) is calculated for eight pixels located at the left and right end sides, and the average value is set as the ground-color-density DL(N) of the line.

In the meantime, when it is determined that the whole data using mode is selected (step S8: NO), the CPU 31A performs the line ground-color-density detection process for the $N_{th}$ line by the whole data using process (step S10), likewise step S5. For example, when reading an image of a document having no blank area in a peripheral edge, a so-called document having no edge, such as the document M1 shown in FIG. 4, it is possible to reduce a process load of the line ground-color-density detection process and to speed up the process by selecting the partial data using mode. On the other hand, when reading an image of a document having a blank area in a peripheral edge, a so-called document having an edge, if the partial data using process is performed, the ground-color-density of a line becomes an image density of the blank area all the time, so that it may not be possible to correctly perform the line ground-color-density detection process. Accordingly, in this case, when the whole data using mode is selected, it is possible to determine whether or not to perform the ground color correction while suppressing an influence of the blank area.

When the ground-color-density DL(N) of a line is detected by the process of step S9 or step S10, the CPU 31A performs line count process. In the line count process, the CPU 31A determines whether a difference between the ground-color-density DL(N) of the detected line an the ground-color-density DE(K) of the area K stored in the memory 31B in step S6 falls within a reference range (step S11). When it is determined that the difference is within the reference range (step S11: YES), the CPU 31A determines that the detected line and a previous line have the substantially same ground-color-density and adds 1 to the number of adjacent lines C(K) of the area K (step S12). That is, the detected line and the previous line are included in the same area K.

After executing the line count process, the CPU 31A determines whether the number of adjacent lines C(K) after the addition reaches a reference number (step S13). The reference number is preferably a half or more of the total number of lines Nmax. When it is not determined that the number of adjacent lines C(K) reaches the reference number (step S13: NO), the process proceeds to step S7. To the contrary, when it is determined that the number of adjacent lines C(K) reaches the reference number (step S13:YES), the CPU 31A performs a document ground-color-density extraction process. In the document ground-color-density extraction process, the CPU 31A regards the area K as a maximum area having the largest number of adjacent lines C(K) and extracts the ground-color-density DE(K) of the area (K) as a ground-color-density DM of the image of the document M (step S14).

Thereby, it is possible to perform the document ground-color-density extraction process at an early stage, compared to a configuration in which the maximum area is extracted after executing the line count process for all the lines of the read image. Also, when the number of adjacent lines C(K) reaches the reference number, the line count process is stopped, and thus the process load is thus reduced. In the example of FIG. 4, when about two-thirds of the area M1B of the document M1 is read, the area M1B is regarded as the maximum area and the line count process is stopped.

On the other hand, when it is determined that the difference between the ground-color-density DL(N) of the detected line and the ground-color-density DL(N) of the area K is beyond the reference range (step S11: NO), the CPU 31A determines that the detected line and the previous line have different ground-color-densities and adds 1 to the area number K and stores the number of adjacent lines C(K) until the that point of time in the memory 13B with corresponding to the area K (step S15). That is, the previous N−1$_{th}$ line is included in the area K and the detected N$_{th}$ line is included in the separate area K+1.

The CPU 31A performs an unprocessed line number determination process of determining whether the number of unprocessed lines, which are not processed in the line count process, is smaller than a maximum value Cmax of the number of adjacent lines C(K) counted and stored beforehand in the memory 31B (step S16). The CPU 31A sets, as the number of unprocessed lines, the number obtained by subtracting the current line number N from the total number of lines Nmax. When it is determined that the number of unprocessed lines is the maximum value Cmax or larger (step S16: NO), the process proceeds to step S7. Compared to this, when it is determined that the number of unprocessed lines is smaller than the maximum value Cmax or larger (step S16: YES), the number of adjacent lines exceeding the maximum value Cmax is not to be counted even though the CPU 31A continues to perform the line count process thereafter. Therefore, the CPU sets an area corresponding to the maximum value Cmax, as the maximum area, and extracts the ground-color-density DE(K) thereof as the ground-color-density DM of the image of the document M (step S17).

Thereby, it is possible to perform the document ground-color-density extraction process at an early stage, compared to a configuration in which the maximum area is extracted after executing the line count process for all the lines of the read image all the time. Also, when it is determined that the number of unprocessed lines is smaller than the maximum value Cmax, the line count process is stopped and the process load is thus reduced. In the example of FIG. 4, since the number of unprocessed lines is larger than the maximum value Cmax at the time when the area MLA of the document M1 has been completely read, the line count process continues.

When the number of adjacent lines C(K) does not reach the reference number (step S13: NO), when the number of unprocessed lines is the maximum value Cmax or larger (step S16: NO) and the reading range is completed (step S2: YES), the CPU 31A sets, as the maximum area, an area corresponding to the maximum value Cmax of the number of adjacent lines C(K) stored in the memory 31B, and extracts the ground-color-density DE(K) thereof as a ground-color-density DM of the image of the document M (step S18).

(3) Correction Process

Figure 7:
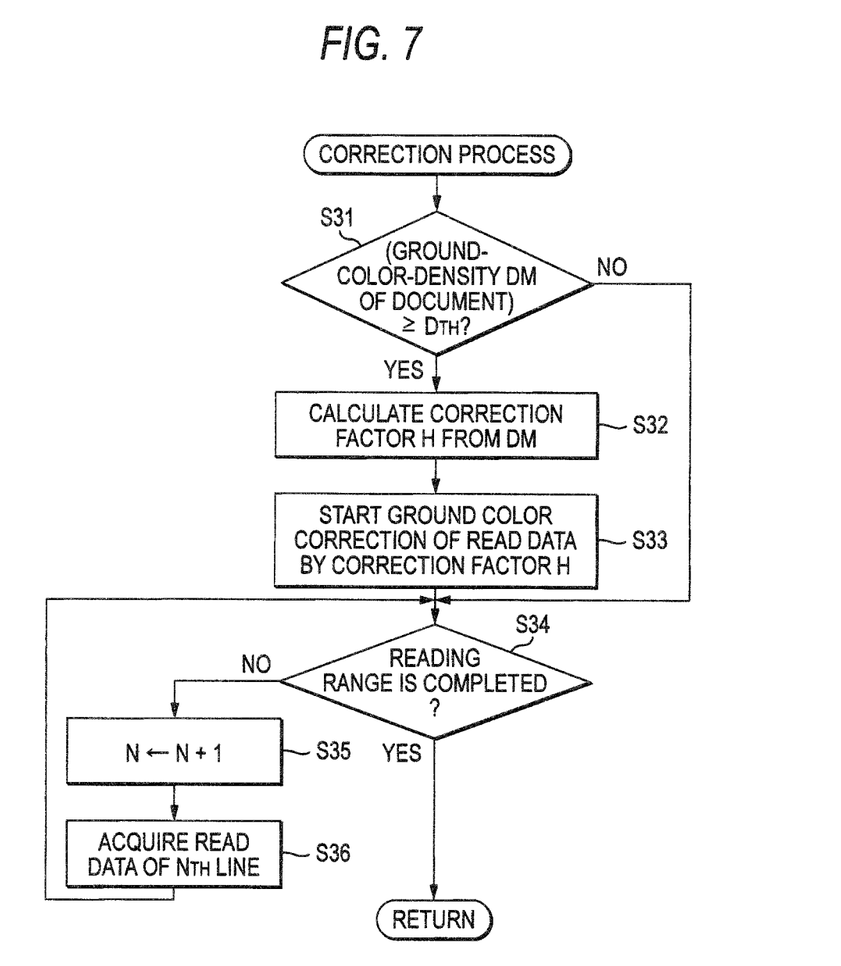
FIG. 7 is a flowchart illustrating a correction process.

When the ground-color-density DM of the image of the document M is extracted in step S14, step S17 and step S18, the CPU 31A performs correction process shown in FIG. 7 (step S19). First, the CPU 31A performs a density determination process of determining whether the extracted ground-color-density DM is a reference value Dth or larger, i.e., the ground-color-density of the document M is a reference density or lower (step S31). When it is determined that the ground-color-density DM is the reference value Dth or larger (step S31: YES), the CPU 31A starts the ground color correction in response to the ground-color-density DM. Specifically, the CPU 31A calculates a correction factor H for making the ground-color-density DM be a higher value, i.e., for diluting or whitening the ground color of the document M (step S32). For example, when the ground-color-density DM is 200, since the tone data of white is 255, the correction factor is 1.275 (=255/200).

When the correction factor H is calculated, the CPU 31A starts the ground color correction by multiplying the tone data of each pixel by the correction factor H, sequentially from the second read data stored in the memory 31B (step S33), and proceeds to step S34. Thereby, as shown in FIG. 4, it is possible to acquire a read image G2 in which the gray solid part is corrected into white for the document M1. In the meantime, the read image G2 is an image having only white and black obtained by comparing the tone data of the respective pixels with a predetermined threshold and then by binarizing the same after the ground color correction. In the meantime, the above ground color correction is an example, and a variety of known ground color corrections can be also applied.

In the meantime, when it is determined that the ground-color-density DM is smaller than the reference value Dth, i.e., when it is determined that the ground-color-density of the document M exceeds the reference density (step S31: NO), the process proceeds to step S34 without performing the ground color correction, like the read image G1 of FIG. 4. That is, in this case, if the ground color correction is performed, the characters and the like are diluted, so that it may be difficult to see the same. When it is determined in step S34 that the reading range is not completed (step S34: NO), the CPU 31A adds 1 to the line number N (step S35), performs the image reading process of acquiring the second read data of the N$_{th}$ line, and returns to step S34. When it is determined that the reading range is completed (step S34: YES), the CPU 31A ends the correction process and the reading process.

(Effects of this Illustrative Embodiment)

According to this illustrative embodiment, the number of lines, which are adjacent to each other and the difference of the ground-color-densities of the lines falls within the reference range, is set as the number of adjacent lines, then the ground-color-density of the line in the area having the largest number of adjacent lines is set the ground-color-density of the document image, and it is determined whether it is necessary to perform the ground color correction process, based on the ground-color-density of the document image. Accordingly, for example, when the document has the area in which the number of adjacent lines is larger than that in the leading end area in which the line reading is performed at first, it is possible to suppress the ground-color-density of the document image from being consistently limited to the ground-color-density of the leading end area of the read image.

Other Illustrative Embodiments

This disclosure is not limited to the above illustrative embodiment described with reference to the above descriptions and drawings, and following various aspects are also included in the technical range of this disclosure.

In the above illustrative embodiment, the multi-function apparatus 1 has been exemplified as the image reading apparatus. However, the image reading apparatus is not limited to the multi-function apparatus, and the image reading apparatus may be a scanner apparatus having only a scanner function, a facsimile apparatus having only a facsimile function, a copier having only scanner and printing functions, and the like. That is, the image reading apparatus may be an apparatus that has a reading device and reads a document image.

In the above illustrative embodiment, the multi-function apparatus 1 having the FB 4 and capable of performing a stationary reading has been exemplified as the image reading apparatus. However, the image reading apparatus may not have the FB 4. For example, the image reading apparatus may have a configuration in which two reading devices are opposed to each other with the conveyance path of the ADF 6 being interposed therebetween. Also, the image reading apparatus may have a configuration in which one reading device and a document reversing mechanism are provided, one surface of a document is read by the reading device, and then the other surface of the document reversed by the document reversing mechanism such as switch back mechanism is read by the reading device.

In the above illustrative embodiment, the control unit 31 has one CPU. However, the control unit 31 may have a plurality of CPUs and may be configured by a hardware circuit such as image processing circuit, for example ASIC (Application Specific Integrated Circuit) or by a CPU and a hardware circuit. Also, in the configuration in which the CPUs or hardware is provided, the CPUs and the like may divide and share a part or all of the respective process such as the image reading process, the line ground-color-density detection process, the line count process, the document ground-color-density extraction process, the unprocessed line number determination process, the density determination process and the like.

In the above illustrative embodiment, the ground color correction program is stored in the memory 31B. However, the ground color correction program is not limited thereto and may be stored in a hard disk drive apparatus, a non-volatile memory such as flash memory (registered trademark), a storage medium such as CD-R, and the like.

In the above illustrative embodiment, the reading instruction of a black and white type has been exemplified. However, this disclosure is not limited thereto. For example, when a reading instruction of a color type is performed, the ground color correction may be performed for a read image of the color. In this case, it is preferable to perform the reading process shown in FIG. 3 for respective colors of R, G and B.

In the above illustrative embodiment, the CPU 31A performs the line ground-color-density detection process by the whole data using process. However, this disclosure is not limited thereto. For example, the CPU 31A may determine a ground-color-density of a line, based on read data of a central part of the line, in any one process of step S5 and step S10.

In the above illustrative embodiment, the CPU 31A sets the average value of the tone data of the pixels on the using object part of the line, as the ground-color-density of the line, in the line ground-color-density detection process. However, the line ground-color-density detection process is not limited thereto. For example, the CPU 31A may set, as the ground-color-density of the line, the tone data the largest number of most pixels in the using object part of the line, a average value of maximum and minimum values of the tone data, the tone data of a part having the largest number of pixels that are adjacent to each other and the difference of the tone data of the pixels falls within a predetermined range, and the like.

In the above illustrative embodiment, the CPU 31A detects the ground-color-density DL(N) of a line by the whole data using process for the leading line of each area K. However, this disclosure is not limited thereto. For example, the CPU 31A may detect the ground-color-density DL(N) of a line for the leading line of each area K by the partial data using process. However, according to the configuration of the above illustrative embodiment, it is possible to suppress the influence depending on whether the document has an edge.

In the above illustrative embodiment, the CPU 31A sets the ground-color-density DL(N) of the leading line of each area, as the ground-color-density DE(K) of the area K. However, this disclosure is not limited thereto. For example, the CPU 31A may set, as the ground-color-density DE(K) of the area K, an average value of the ground-color-densities DL(K) of lines in the area K, a central value of maximum and minimum values thereof or tone data in which the largest number of lines is appeared.

In the above illustrative embodiment, the operation unit 38 has been exemplified as the selection receiving unit. However, this disclosure is not limited thereto. For example, a configuration of multi-function apparatus 1 has a data communication unit for receiving a mode selection instruction from an external device, and the data communication unit is an example of the selection receiving unit. Also, when it is determined that a document is a document having no edge, based on read data of a leading line of the document, the CPU 31A may automatically select the partial data using mode, and when it is determined that a document is a document having an edge, the CPU may automatically select the whole data using mode.

In the above illustrative embodiment, in the line count process, the CPU 31A determines whether the difference between the ground-color-density DL(N) of the detected line and the ground-color-density DE(K) of the area K stored in the memory 31B in step S6 is the reference value or smaller. However, this disclosure is not limited thereto. For example, the CPU 31A may determine whether a difference between the ground-color-density DL(N) of the detected line and the ground-color-density DL(N−1) of the previous line of the detected line, or whether an average value of the ground-color-densities DL(N) of the lines before the previous line of the detected line in the area K is the reference value or smaller.

In the above illustrative embodiment, when the line of adjacent lines C(K) reaches the reference number, the document ground-color-density extraction process is performed. However, for example, when it is determined that the number of adjacent lines in the other area except for the leading end area exceeds the number of adjacent lines in the leading end area, an average value of the ground-color-densities of the lines in the other area may be set as the ground-color-density DM of the image of the document M. Thereby, for example, when the document has the area in which the number of adjacent lines is larger than that in the leading end area in which the line reading is performed at first, it is possible to suppress the ground-color-density of the document image from being consistently limited to the ground-color-density of the leading end area of the read image. Also, it is possible to perform the document ground-color-density extraction process at an early stage, compared to a configuration in which the ground-color-density of the document image is extracted after executing the line count process for all the lines of the read image.

What is claimed is:
1. An image reading apparatus comprising:
  a reading device configured to read a document image; and
  a control unit,
  wherein the control unit configured to perform:
    an image reading process of controlling the reading device to read the document image every line and acquire read data of respective lines;
    a line ground-color-density detection process of detecting a ground-color-density of respective lines from the read data acquired by the image reading process;
    a line count process of counting the number of adjacent lines, which is the number of lines that are adjacent to each other and a difference of the ground-color-densities of the lines falls within a reference range, based on a detection result of the line ground-color-density detection process;
    a document ground-color-density extraction process of extracting a ground-color-density of a line in an area having the largest number of adjacent lines from a read image of the document image, as a ground-color- density of the document image, based on a count result of the line count process; and a density determination process of determining whether the ground-color-density of the document image extracted in the document ground-color-density extraction process is a reference density or lower, and a ground color correction process of performing, when it is determined in the density determination process that the ground-color-density of the document image is the reference density or low, a ground color correction for the read data, in response to the ground-color-density of the document image.

2. The image reading apparatus according to claim 1, wherein, when the number of adjacent lines reaches a reference number, which is a half or more of the total number of lines of the read image by the line count process, the control unit performing the document ground-color-density extraction process extracts a ground-color-density of a line in an area in which the number of adjacent lines reaches the reference number, as the ground-color-density of the document image.

3. The image reading apparatus according to claim 1, wherein the control unit is configured to perform an unprocessed line number determination process of determining whether the number of unprocessed lines, which are not processed in the line count process, is smaller than a maximum value of the number of the previously counted adjacent lines; and wherein, when it is determined by the unprocessed line number determination process that the number of unprocessed lines is smaller than the maximum value of the number of adjacent lines, the control unit performing the document ground-color-density extraction process extracts a ground-color-density of a line in an area having the largest number of adjacent lines, as the ground-color-density of the document image.

4. The image reading apparatus according to claim 1, wherein the control unit performing the line count process counts the number of adjacent lines in a leading end area including a leading line with respect to a reading direction of the reading device, and then the control unit determines whether the number of adjacent lines in other area except for the leading end area exceeds the number of adjacent lines in the leading end area, and wherein, when it is determined that the number of adjacent lines in the other area exceeds the number of adjacent lines in the leading end area, the control unit performing the document ground-color-density extraction process extracts a ground-color-density of a line in the other area, as the ground-color-density of the document image.

5. The image reading apparatus according to claim 1, wherein the control unit in the line ground-color-density detection process performs a partial data using process determining a ground-color-density of the line, based on read data of one end or both end sides of the line.

6. The image reading apparatus according to claim 5, further comprising a selection receiving unit that receives a selection instruction of selecting any one of a partial data using mode and a whole data using mode, wherein, when the selection receiving unit receives a selection instruction of selecting the partial data using mode, the control unit is performing the line ground-color-density detection process by the partial data using mode, and wherein when the selection receiving unit receives a selection instruction of selecting the whole data using mode, the control unit is performing the line ground-color-density detection process by whole data using mode determining a ground-color-density of respective lines, based on read data of the whole line.

* * * * *